United States Patent
Takahashi et al.

(10) Patent No.: US 11,183,914 B2
(45) Date of Patent: Nov. 23, 2021

(54) VIBRATION ACTUATOR AND ELECTRONIC EQUIPMENT

(71) Applicants: Yuki Takahashi, Tokyo (JP); Chikara Sekiguchi, Tokyo (JP); Yuta Yoshii, Tokyo (JP); Daisuke Kodama, Tokyo (JP); Shigenori Inamoto, Tokyo (JP)

(72) Inventors: Yuki Takahashi, Tokyo (JP); Chikara Sekiguchi, Tokyo (JP); Yuta Yoshii, Tokyo (JP); Daisuke Kodama, Tokyo (JP); Shigenori Inamoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 153 days.

(21) Appl. No.: 16/288,242

(22) Filed: Feb. 28, 2019

(65) Prior Publication Data

US 2019/0296627 A1 Sep. 26, 2019

(30) Foreign Application Priority Data

Mar. 26, 2018 (JP) .............................. JP2018-058074

(51) Int. Cl.
*H02K 33/18* (2006.01)
*H02K 33/16* (2006.01)
(Continued)

(52) U.S. Cl.
CPC ............. *H02K 33/18* (2013.01); *H02K 33/16* (2013.01); *H02K 35/02* (2013.01); *H02K 35/04* (2013.01); *G08B 6/00* (2013.01)

(58) Field of Classification Search
CPC ................................ H02K 33/16; H02K 33/18
(Continued)

(56) References Cited

U.S. PATENT DOCUMENTS

2004/0104625 A1* 6/2004 Wakuda ................ B06B 1/0215
310/15
2014/0054983 A1* 2/2014 Moon .................... H02K 33/16
310/28

(Continued)

FOREIGN PATENT DOCUMENTS

CN 206992922 U 2/2018
JP 10-117472 A 5/1998
(Continued)

OTHER PUBLICATIONS

Extended European Search Report for Application No. 19159690.7 dated Aug. 14, 2019, 11 pages.

*Primary Examiner* — Jose A Gonzalez Quinones
(74) *Attorney, Agent, or Firm* — Brundidge & Stanger, P.C.

(57) ABSTRACT

A vibration actuator includes a movable body provided with one of a coil and a magnet that is disposed radially inward of the coil with a gap formed therebetween, a fixing body provided with the other of the coil and the magnet and a shaft portion, and an elastic support portion, the movable body vibrating in a vibration direction by means of cooperation between the coil supplied with power and the magnet. The movable body is provided with a through-hole into which the shaft portion is inserted with a gap formed between the through-hole and an outer peripheral surface of the shaft portion and the elastic support portion supports the movable body such that the movable body does not come into contact with the shaft portion at a time when the movable body does not vibrate and at a time when the movable body vibrates.

16 Claims, 10 Drawing Sheets

(51) Int. Cl.
    *H02K 35/02*     (2006.01)
    *H02K 35/04*     (2006.01)
    *G08B 6/00*     (2006.01)

(58) Field of Classification Search
    USPC .............................................. 310/25, 51, 81
    See application file for complete search history.

(56) References Cited

U.S. PATENT DOCUMENTS

| | | | | |
|---|---|---|---|---|
| 2014/0077628 | A1* | 3/2014 | Yamada | B06B 1/045 |
| | | | | 310/12.16 |
| 2015/0226197 | A1* | 8/2015 | Hahn | F04B 39/0005 |
| | | | | 417/363 |
| 2017/0314632 | A1* | 11/2017 | Kanaya | F16F 7/1011 |

FOREIGN PATENT DOCUMENTS

| | | | |
|---|---|---|---|
| JP | 2011153678 A | | 8/2011 |
| KR | 2010120894 A1 | * | 11/2010 |

\* cited by examiner

VIBRATION ACTUATOR AND ELECTRONIC EQUIPMENT

CROSS REFERENCE TO RELATED APPLICATIONS

This application is entitled to and claims the benefit of Japanese Patent Application No. 2018-58074, filed on Mar. 26, 2018, the disclosure of which including the specification, drawings and abstract is incorporated herein by reference in its entirety.

TECHNICAL FIELD

The present invention relates to a vibration actuator and electronic equipment that is provided with the same.

BACKGROUND ART

In the related art, a vibration actuator as a vibration generation source is mounted in electronic equipment having a vibration function. The electronic equipment can perform notification about an incoming call or improve operational feeling or a sense of realism by driving the vibration actuator such that vibration is transmitted to a user and the user feels the vibration. Here, examples of the electronic equipment include portable equipment such as a portable game terminal, a controller (gamepad) for a non-portable game machine, a portable communication terminal such as a cellular phone or a smart phone, a portable information terminal such as a tablet PC, and a wearable terminal which is mounted on clothes or an arm.

As a vibration actuator that is mounted in portable equipment and that can be reduced in size, for example, a vibration actuator that is used for a pager or the like as in PTL 1 has been known.

In the vibration actuator, a pair of plate-shaped elastic bodies is supported by a frame body such that the plate-shaped elastic bodies face each other and a yoke to which a magnet is attached is fixed to and supported by a swollen central portion of a plate-shaped elastic body having a vortex-like shape, which is one of the pair of plate-shaped elastic bodies. The yoke constitutes a magnetic field generating body together with the magnet and in a magnetic field of the magnetic field generating body, a coil is disposed in a state of being attached to the other plate-shaped elastic body. When electric currents having different frequencies are applied to the coil in a switching manner through an oscillation circuit, the pair of plate-shaped elastic bodies selectively resonates to generate vibration and the yoke vibrates in a direction along a central line of the frame body.

In the vibration actuator, a distance between the magnet and the coil and a distance between the yoke and the coil are larger than a distance between the yoke and an inner peripheral wall of the frame body. Accordingly, in a case where a shock from the outside is received, the yoke collides with the inner peripheral wall of the frame body first such that the yoke or the magnet does not come into contact with the coil and the coil is prevented from being damaged.

However, actually, since the yoke including the magnet collides with the frame body, there is a possibility that the pair of plate-shaped elastic bodies elastically supporting a movable body including the yoke is damaged due to the shock.

Therefore, PTL 1 also discloses a configuration in which a fixing body is provided with a shaft, along which the movable body slides and moves in a vibration direction, such that the yoke, which is the movable body, does not move to the inner peripheral surface of the frame body due to the shaft even when a shock from the outside is received and thus the yoke is prevented from colliding with the frame body.

CITATION LIST

Patent Literature

PTL 1
Japanese Patent Application Laid-Open No. 10-117472

SUMMARY OF INVENTION

Technical Problem

However, in the case of the configuration of the vibration actuator in the related art in which the fixing body is provided with the shaft along which the movable body slides, shock resistance can be improved since a movement of the movable body is regulated by the shaft but there is a possibility that a sliding sound is generated since the movable body slides along a shaft portion when being driven.

Since a noise generated due to contact like a vibration sound or the like has a problem that the vibration expression of the vibration actuator itself is degraded, it is desired that the vibration actuator that vibrates by means of the movable body which is movable outputs body-felt vibration without a vibration noise in a state where a vibration expression ability is high such that vibration is transmitted to a user and the user sufficiently feels the vibration. That is, it is desired that the vibration actuator outputs preferable body-felt vibration.

An object of the present invention is to provide a vibration actuator that is resistant to a shock and that can output preferable body-felt vibration and electronic equipment.

Solution to Problem

In order to achieve the object mentioned above, the present invention provides a vibration actuator, including: a movable body including one of a coil and a magnet disposed on a radially inner side of the coil while being spaced from the coil; a fixing body including the other one of the coil and the magnet, and a shaft portion that is inserted into the movable body; and an elastic support portion movably supporting the movable body with respect to the fixing body, the movable body vibrating with respect to the fixing body in a vibration direction by means of cooperation between the coil supplied with power and the magnet, in which the movable body is provided with a through-hole into which the shaft portion is inserted with a gap formed between the through-hole and an outer peripheral surface of the shaft portion, and the elastic support portion supports the movable body such that the movable body does not come into contact with the shaft portion at a time when the movable body does not vibrate and at a time when the movable body vibrates.

The present invention employs a configuration in which the vibration actuator of the configuration described above is mounted.

Advantageous Effects of Invention

According to the present invention, it is possible to achieve shock resistance and to output preferable body-felt vibration with a high vibration expression ability.

DESCRIPTION OF EMBODIMENTS

Hereinafter, an embodiment of the present invention will be described in detail with reference to drawings.

[Entire Configuration of Vibration Actuator]

Figure 1:
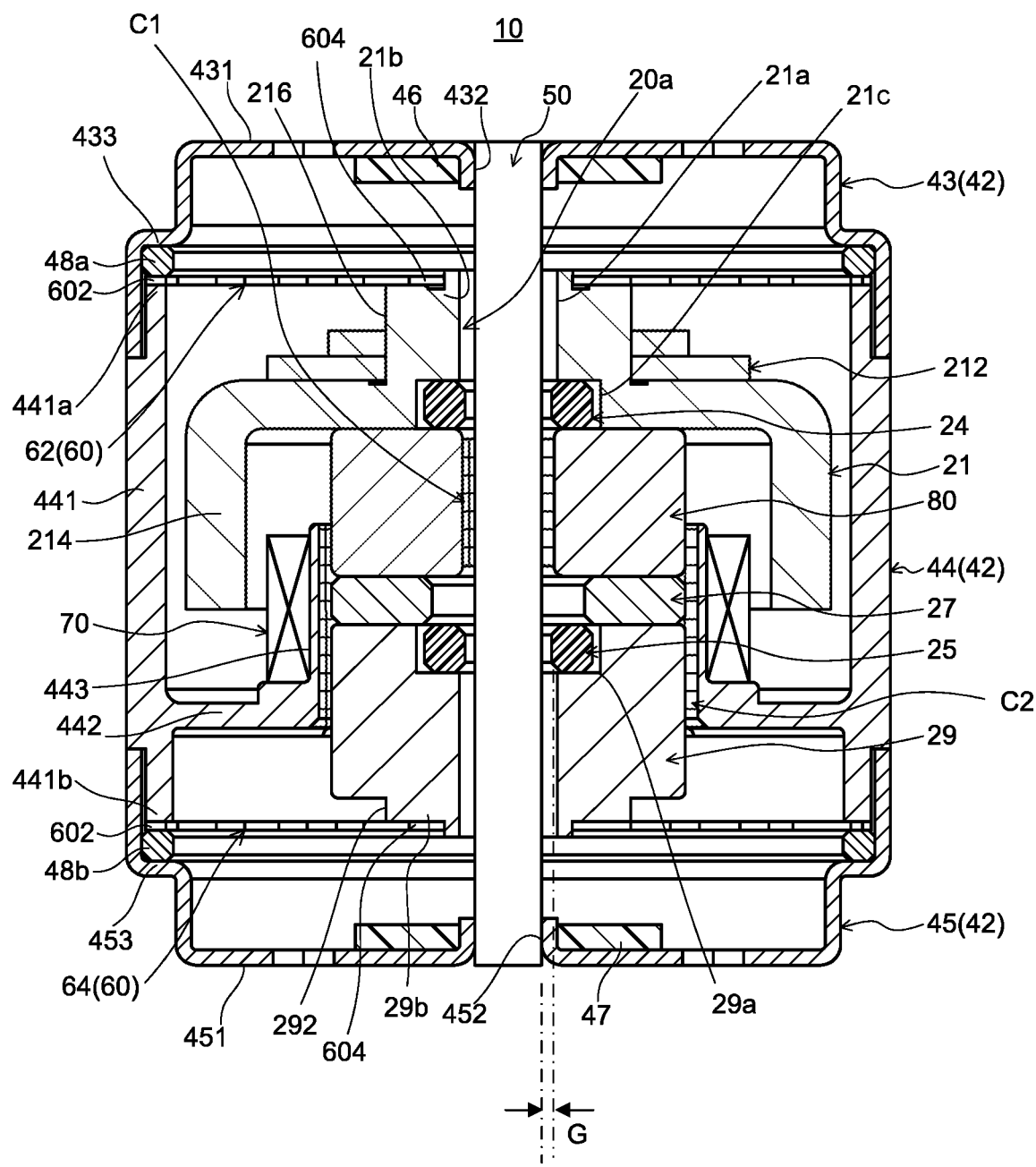
FIG. 1 is a longitudinal sectional view illustrating a vibration actuator according to an embodiment of the present invention.
Figure 2:
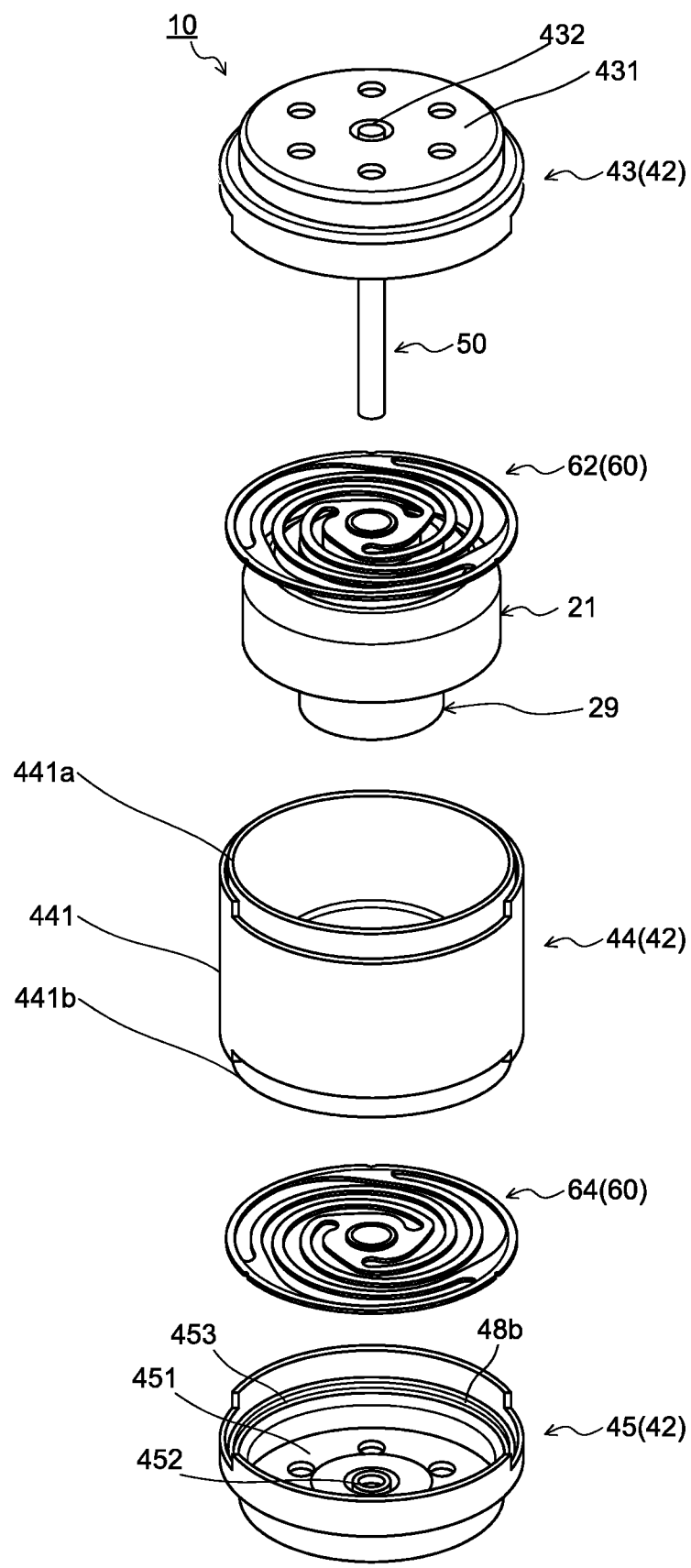
FIG. 2 is a top-side exploded perspective view illustrating a state where a movable body is detached from the vibration actuator.
Figure 3:
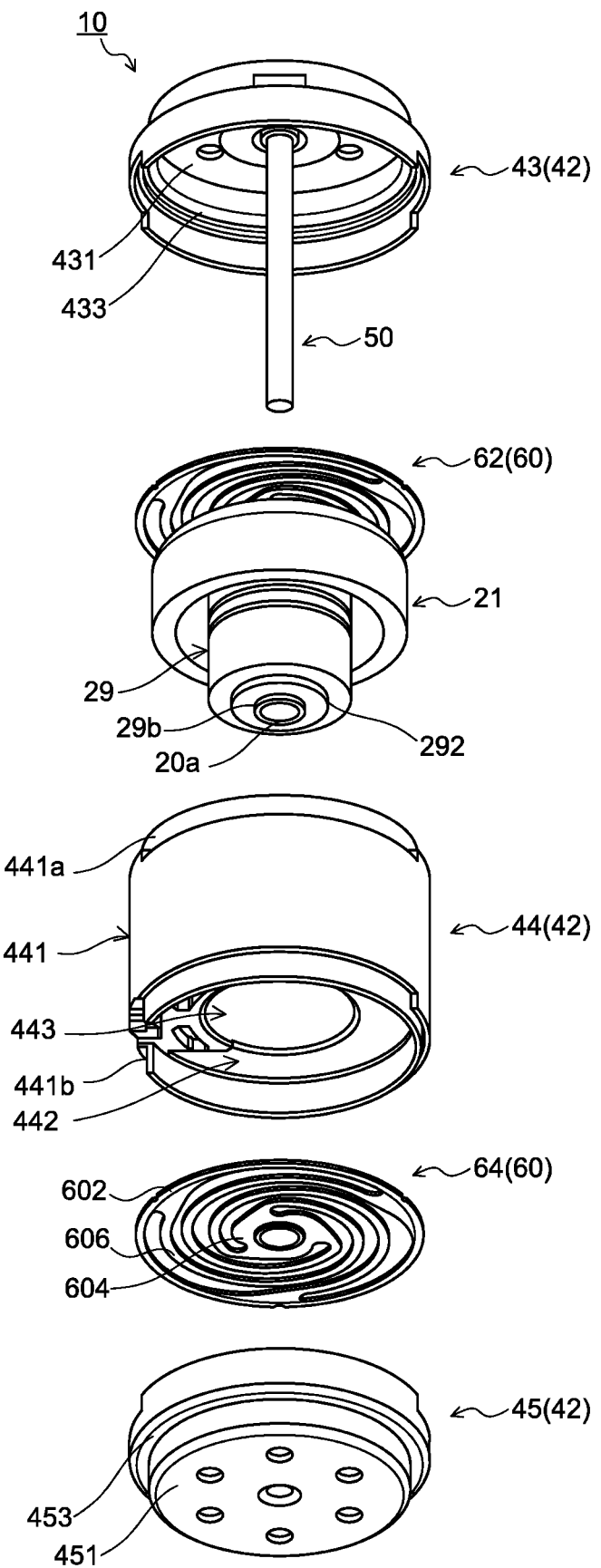
FIG. 3 is a bottom-side exploded perspective view illustrating a state where the movable body is detached from the vibration actuator.
Figure 4:
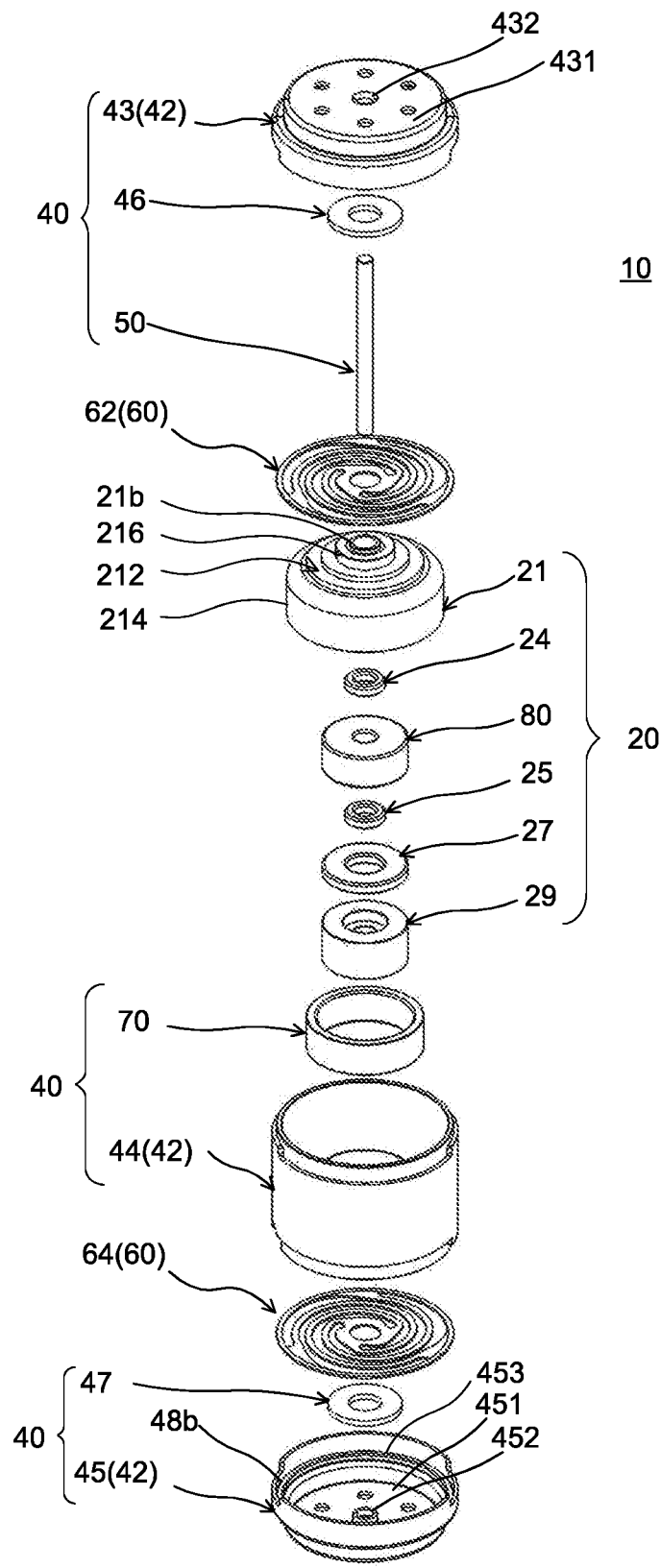
FIG. 4 is an exploded perspective of the entire vibration actuator.
Figure 5:
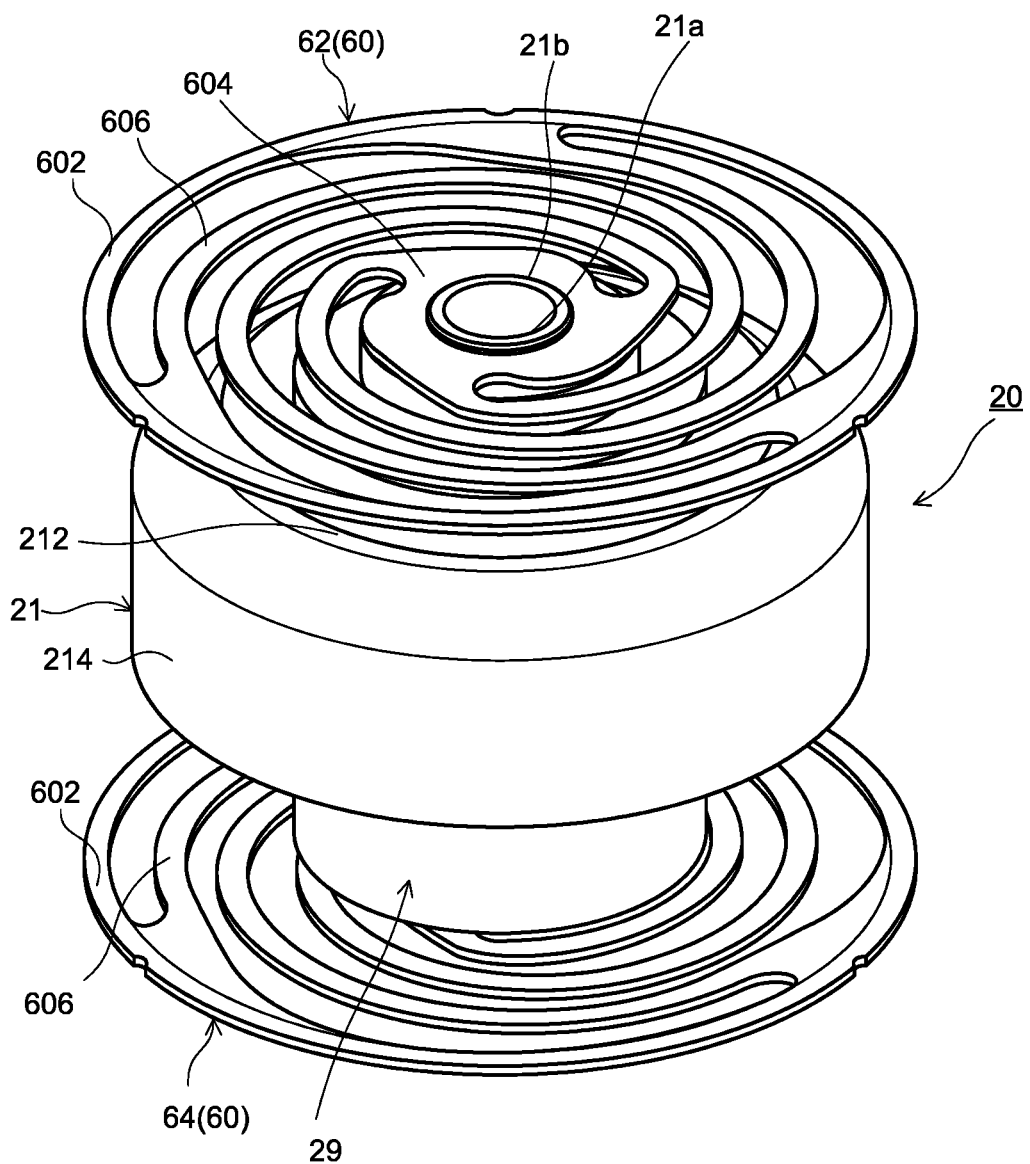
FIG. 5 is a perspective view illustrating the movable body and elastic support portions of the vibration actuator.

FIG. 1 is a longitudinal sectional view illustrating vibration actuator 10 according to an embodiment of the present invention, FIG. 2 is a top-side exploded perspective view illustrating a state where movable body 20 is detached from vibration actuator 10, and FIG. 3 is a bottom-side exploded perspective view illustrating a state where movable body 20 is detached from vibration actuator 10. In addition, FIG. 4 is an exploded perspective of entire vibration actuator and FIG. 5 is a perspective view illustrating movable body 20 and elastic support portions 60 of vibration actuator 10. Note that, an "upper" side and a "lower" side in the present embodiment are assigned for the sake of convenience in order to facilitate understanding and refer to one side and the other side in a vibration direction of movable body 20 of vibration actuator 10, respectively. That is, the upper and lower sides may be reversed and the upper and lower sides may be on right and left sides when vibration actuator 10 is installed in electronic equipment (refer to FIGS. 10 and 11).

Vibration actuator 10 illustrated in FIGS. 1 to 4 is mounted in electronic equipment, specifically, portable equipment (for example, portable terminal M in FIG. 11) such as a portable game terminal (for example, game controller GC in FIG. 10) or a smart phone as a vibration generation source and realizes a vibration function of the portable equipment. Vibration actuator 10 is driven to notify a user of an incoming call or give operational feeling or a sense of realism.

Vibration actuator 10 includes movable body 20 that includes magnet 80, elastic support portions 60, and fixing body 40 that includes coil 70 and that supports movable body 20 via elastic support portion 60 such that movable body 20 can reciprocate.

In vibration actuator 10, coil 70 and magnet 80 constitute a magnetic circuit that causes movable body 20 to vibrate. In vibration actuator 10, when coil 70 is energized from a power supply section (for example, driving control section 203 illustrated in FIGS. 10 and 11), coil 70 and magnet 80 cooperate to cause movable body 20 to reciprocate and vibrate in the vibration direction relative to fixing body 40.

Vibration actuator 10 in the present embodiment causes movable body 20 to reciprocate and vibrate in a magnetization direction of magnet 80 (corresponds to direction in which shaft 50 extends or axial direction of coil 70). In vibration actuator 10, at a time when vibration actuator 10 does not vibrate and move, movable body 20 is supported via elastic support portions 60 without being in contact with shaft (shaft portion) 50 and at a time when movable body 20 moves as well, movable body 20 is supported via elastic support portions 60 without being in contact with 50. Vibration actuator 10 holds movable body 20 such that movable body 20 does not come into contact with shaft 50 at a time when movable body 20 does not vibrate and at a time when movable body 20 vibrates. Vibration actuator 10 in the present embodiment further includes magnetic fluids C1 and C2 provided between fixing body 40 and the movable body 20.

Note that, for vibration actuator 10 in the present embodiment, a so-called moving magnet type configuration in which coil 70 is provided on fixing body 40 side, magnet 80 is provided on movable body 20 side, and magnet 80 side is movable is adopted. However, the invention is not limited thereto. A moving coil type configuration in which movable body 20 is provided with coil 70 and magnet 80 is provided on fixing body 40 side may also be adopted.

In vibration actuator 10 in the present embodiment, as illustrated in FIG. 5, elastic support portions 60 are a plurality of plate springs (upper plate spring 62 and lower plate spring 64) that are attached to movable body 20 to be separated from each other in the vibration direction. Detailed description of upper plate spring 62 and lower plate spring 64 will be made later.

<Movable Body 20>

Movable body 20 illustrated in FIGS. 1 to 4 is supported between upper case 43 and lower case 45 of fixing body 40 such that movable body 20 can reciprocate in a direction, in which upper case 43 and lower case 45 face each other, along shaft 50 (refer to FIG. 1) inserted into through-hole 20a formed in a central portion by means of elastic support portions 60.

Through-hole 20a is provided to penetrate movable body 20 in the vibration direction (vertical direction in present embodiment). Shaft 50 that is disposed between upper and lower cases 43 and 45 of fixing body 40 is inserted into through-hole 20a such that an outer peripheral surface of shaft 50 and an inner peripheral surface of through-hole 20a do not come into contact with each other.

In the present embodiment, movable body 20 includes movable body core 21, bush 24, magnet 80, bush 25, center yoke 27, and weight portion 29. In movable body 20, shaft 50 is inserted into magnet 80, center yoke 27, and weight portion 29 with a gap G provided therebetween and magnet 80, center yoke 27, and weight portion 29 are consecutively connected to each other in the vibration direction. In movable body 20 in the present embodiment, magnet 80 is interposed between flat plate portion 212 of movable body core 21 and center yoke 27 and weight portion 29 is provided on the center yoke 27 side. An opening is provided in a central portion of each of movable body core 21, bush 24, magnet 80, bush 25, center yoke 27, and weight portion 29 and the openings are consecutively disposed on the same axis to constitute through-hole 20a of movable body 20. Shaft 50 is movably inserted into the consecutive openings of movable body core 21, bush 24, magnet 80, bush 25, center yoke 27, and weight portion 29 such that gap G between the inner peripheral surface of through-hole 20a and the outer peripheral surface of shaft 50 is formed.

Magnet 80 is fixed to the movable body core 21. Movable body core 21 is disposed to cover outer peripheral sides and upper surface sides of magnet 80 fixed thereto and coil 70 fixed on fixing body 40 side. Movable body core 21 constitutes an outer peripheral portion of movable body 20.

In the present embodiment, movable body core 21 is a magnetic substance that is provided with flat plate portion 212 and ring section 214 and that has a lidded cylindrical shape. Flat plate portion 212 and ring portion 214 are disposed to surround magnet 80 that is disposed inward of flat plate portion 212 and ring portion 214 and function as yokes. In the present embodiment, movable body core 21 is disposed to cover coil 70 as well that is disposed close to an outer peripheral side of magnet 80.

Movable body core 21 is composed of magnetic material and constitutes a magnetic circuit together with coil 70, magnet 80, and center yoke 27. Movable body core 21 of movable body 20 has a function as a main body portion of movable body 20, a function as a portion of the magnetic circuit, and a function as a weight.

Flat plate portion 212 of movable body core 21 has an annular plate-like shape and opening (corresponds to through-hole 20a) 21a into which shaft 50 is inserted is formed in a central portion thereof. Magnet 80 is fixed to a lower surface (rear surface) of flat plate portion 212 and ring portion 214 is fixed to the lower surface such that ring portion 214 protrudes downward from an outer peripheral portion of flat plate portion 212.

An upper surface (front surface) side of flat plate portion 212 is provided with tubular protruding portion 216 that protrudes upward is provided. Spring fixation portion 21b is formed on an upper end portion of tubular protruding portion 216 and has an annular shape that extends in a circumferential direction along an opening edge portion. Inner peripheral portion 604 of upper plate spring 62, which is an inner spring end portion of upper plate spring 62, is bonded to spring fixation portion 21b.

Opening edge portion of the lower surface of flat plate portion 212 is provided with recessed counterbored portion 21c. In counterbored portion 21c, bush 24 functioning as a contact member is disposed.

Bush 24 may be press-fitted into counterbored portion 21c. Bush 24 as a contact member functions as a contact portion that comes into contact with shaft 50 when shaft 50 inserted into through-hole 20a is displaced in movable body 20. The contact member is composed of low-rigidity material such as resin or elastomer and can alleviate a shock force, which is generated when the contact member comes into contact with shaft 50, such that shaft 50 can be prevented from being damaged. In the present embodiment, bush 24 which is the contact member is formed in an annular shape together with bush 25 incorporated into weight portion 29 and at a time when movable body 20 does not vibrate, shaft 50 is inserted to be movable in an axial direction in a state where gap G is formed between shaft 50 and an outer circumference of bush 24.

Bush 24 as the contact member is provided with an inner peripheral surface that faces the outer peripheral surface of shaft 50 with gap G provided therebetween. An inner peripheral surface of bush 24 is a portion of the inner peripheral surface of movable body 20 together with an inner peripheral surface of bush 25, the peripheral surface of movable body 20 defining through-hole 20a.

Ring portion 214 is a tubular body and in the present embodiment, an opening edge portion of ring portion 214, which is an opening lower end portion, is positioned close to an outer peripheral surface of coil 70 to face the vicinity of an axial central portion of coil 70 while being separated from the axial central portion of coil 70. Movable body core 21 is disposed to cover magnet 80 and an upper side of coil 70 at a position close to the outer peripheral side and the upper surface side of magnet 80.

The opening edge portion of ring portion 214 is disposed to face inner bottom portion 442 in coil holder 44 with a predetermined gap formed therebetween. Since the predetermined gap is provided, a movable region for movable body 20 can be secured in the vibration direction.

Magnet 80 is formed in a cylindrical shape and is magnetized in the vibration direction. In the present embodiment, magnet 80 is magnetized in two directions in which magnet 80 is open (which are directions in which shaft 50 extends and correspond to axial direction of coil 70). In the present embodiment, magnet 80 is formed such that the upper side thereof becomes an S pole and the lower side becomes an N pole. Magnet 80 is fixed to flat plate portion 212 of movable body core 21 by using, for example, a thermosetting adhesive such as epoxy resin.

Magnet 80 is disposed inward of coil 70 in a radial direction with a predetermined gap formed between magnet 80 and coil 70. Here, the "radial direction" is a direction orthogonal to an axis of coil 70. The "predetermined gap" in the radial direction is a gap in which magnet 80 and coil 70 can move without coming into contact with each other in the magnetization direction and means a gap between coil 70 side and magnet 80 including the thickness of inner tubular portion 443 that is on an inner side of coil 70.

As illustrated in FIG. 1, in the present embodiment, magnet 80 is disposed such that an upper portion of coil 70 faces a radially outer side of a lower portion of magnet 80. Note that, magnet 80 may have a shape other than a cylindrical shape as long as magnet 80 is disposed inward of coil 70 and two magnetization surfaces face a direction in which the axis of coil 70 extends.

Center yoke 27 is disposed to come into close-contact with magnet 80 and is for concentrating a magnetic flux of magnet 80 and causing the magnetic flux to efficiently flow without leakage. In the present embodiment, center yoke 27 is positioned inward of (radially inward of) coil 70 such that center yoke 27 faces the central portion of coil 70 in the axial direction (vibration direction) as seen in a direction orthogonal to the axial direction of coil 70 at a time when movable body 20 does not vibrate.

Weight portion 29 increases the vibration output of movable body 20 and fixes lower plate spring 64, which is elastic support portion 60.

In the present embodiment, weight portion 29 has a cylindrical shape and is consecutively connected to center yoke 27 through adhesion or the like in the vibration direction, that is, in a direction along shaft 50. Weight portion 29 is fixed to center yoke 27 by using, for example, a thermosetting adhesive such as epoxy resin.

Weight portion 29 is provided under center yoke 27 as a member serving both as a spring fixation portion fixing lower plate spring 64 and a weight. Accordingly, it is not necessary to assemble members that respectively have a function as a weight and a spring fixation function and it is possible to improve ease of assembly since it is possible to easily attach lower plate spring 64 only by providing weight portion 29. In addition, since weight portion 29 is not provided on an outer peripheral side of movable body 20, a disposition space for the coil positioned close to the outer peripheral side of movable body 20 is not limited and there is no decrease in electromagnetic conversion efficiency. Accordingly, it is possible to preferably increase the weight of movable body 20 and to realize a high vibration output.

Weight portion 29 may be composed of magnetic material. However, it is desirable that weight portion 29 is composed of non-magnetic material. If weight portion 29 is composed of non-magnetic material, a magnetic flux from center yoke 27 which is positioned above weight portion 29 can efficiently proceed to coil 70, which is positioned close to an outer peripheral side of center yoke 27, without flowing downward.

It is preferable that weight portion 29 is composed of material of which the specific gravity is higher than that of material such as a stainless steel sheet (specific gravity of SUS and steel sheet is 7.70 to 7.98) (for example, material of which specific gravity is about 16 to 19). As the material of weight portion 29, for example, tungsten can be adopted. Accordingly, even in a case where the external dimensions of movable body 20 are set in design or the like, it is possible to increase the mass of movable body 20 relatively easily and to realize a desired vibration output which results in sufficient body-felt vibration with respect to a user.

A surface of weight portion 29 that is on center yoke 27 side is provided with recessed counterbored portion 29a formed on the opening edge section. Bush 25 that functions as a contact member in the same manner as bush 24 is disposed in counterbored portion 29a. Bush 25 may be press-fitted into counterbored portion 29a. In addition, a surface (lower surface) of weight portion 29 that is on a side opposite to center yoke 27 side is provided with spring fixation portion 29b protruding from the vicinity of the opening. Inner peripheral portion 604 of lower plate spring 64, which is an inner spring end portion of lower plate spring 64 out of elastic support portions 60, is bonded to spring fixation portion 29b. Spring fixation portion 29b is formed at a tip end of tubular protruding portion 292 that protrudes toward a lower surface of a main body of weight portion 29. A level difference is provided between the main body of weight portion 29 and spring fixation portion 29b corresponding to a length by which tubular protruding portion 292 protrudes. The level difference provides an elastic deformation region for lower plate spring 64 that extends radially outward from spring fixation portion 29b.

In the above-described configuration, the inner peripheral surface of bush 24 and the inner peripheral surface of bush 25 are separated from the outer peripheral surface of shaft 50 and are provided to be positioned closer to the outer peripheral surface of shaft 50 than inner peripheral surfaces of movable body core 21, magnet 80, center yoke 27, and weight portion 29 in the present embodiment. Accordingly, in a case where movable body 20 and shaft 50 in through-hole 20a of movable body 20 relatively move, shaft 50 that collides with the inner peripheral surface defining through-hole 20a comes into contact with bushes 24 and 25 constituting a portion of the inner peripheral surface of through-hole 20a. Therefore, it is possible to alleviate a shock with respect to all of portions of movable body core 21, magnet 80, center yoke 27, and weight portion 29 that are on fixing body 40 side and shaft 50. In particular, it is possible to prevent shaft 50 from being damaged.

In addition, since bushes 24 and 25 are buried in counterbored portion 21c of movable body core 21 and counterbored portion 29a of weight portion 29, movable body core 21, magnet 80, center yoke 27, and weight portion 29 are consecutively connected to each other in a state of being in close-contact with each other with annular surfaces abutting onto each other therebetween.

In addition, bush 24 is disposed between movable body core 21 and magnet 80, bush 25 is disposed between center yoke 27 and weight portion 29, and bushes 24 and 25 cannot be extracted in the axial direction.

<Fixing Body 40>

In the present embodiment, fixing body 40 is provided with coil 70 out of coil 70 and magnet 80 (refer to FIGS. 1 and 4) and is provided with shaft 50 inserted into movable body 20.

Fixing body 40 is provided with casing 42 that surrounds movable body 20 and shaft 50 is inserted into through-hole 20a of movable body 20 accommodated in casing 42 and is fixed to casing 42.

In the present embodiment, casing 42 is a columnar hollow body. Casing 42 is provided with tubular coil holder 44 that holds coil 70 and surrounds movable body 20 and is provided with upper case 43 and lower case 45 to which opposite end portions of shaft 50 are fixed and that close opposite end openings of coil holder 44.

In vibration actuator 10, coil 70 is used to generate a vibration source of vibration actuator 10 together with magnet 80, with the axial direction (magnetization direction of magnet 80) serving as the vibration direction. Coil 70 is energized when being driven and coil 70 constitutes a voice coil motor together with magnet 80.

Coil 70 is, for example, disposed to be coaxial with magnet 80 and an axial direction of magnet 80 (direction in which shaft 50 extends).

Coil 70 is disposed such that a longitudinal central position thereof in the vibration direction is at the substantially same height as a longitudinal central position of center yoke 27 in the vibration direction.

Figure 10:
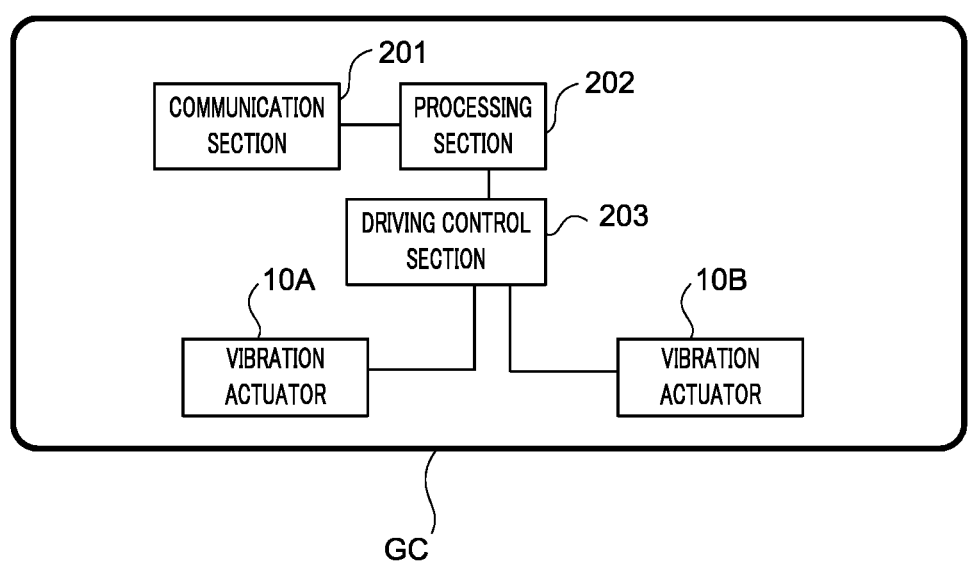
FIG. 10 is a view illustrating an example of electronic equipment into which the vibration actuator is mounted.
Figure 11:
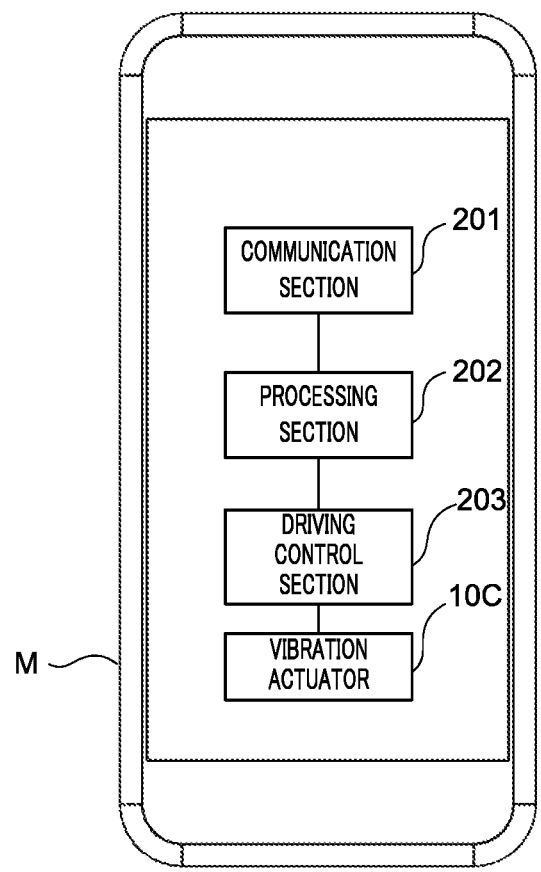
FIG. 11 is a view illustrating another example of electronic equipment into which the vibration actuator is mounted.

Opposite end portions of coil 70 are connected to the power supply section (for example, driving control section 203 illustrated in FIGS. 10 and 11). For example, the opposite end portions of coil 70 are connected to an AC supplying section and AC power (AC voltage) is supplied to coil 70 from the AC supplying section. Accordingly, coil 70 can generate thrust between coil 70 and the magnet such that coil 70 and the magnet can move in a contact/separation direction along the axial directions thereof.

In a case where magnet 80 is magnetized such that the S pole is on flat plate portion 212 side (upper side in present embodiment) and the N pole is on center yoke 27 side, a magnetic flux that is radiated from bonded portions between magnet 80 and center yoke 27 and center yoke 27 and is incident from flat plate portion 212 side is formed. Therefore, the magnetic flux crosses the entire portion of coil 70, which is disposed to surround magnet 80 and center yoke 27, from an inner side to an outer side in the radial direction of coil 70 and thus Lorentz forces act in the same direction (direction F or direction −F illustrated in FIG. 9) when coil 70 is energized.

Shaft 50 is resistant to a shock that is generated when shaft 50 is displaced within through-hole 20a of movable body 20 and comes into contact with the inner peripheral surface of through-hole 20a, specifically, bushes 24 and 25 which are the contact members.

The opposite end portions of shaft 50 are respectively fixed to upper case 43 and lower case 45 such that shaft 50 itself is positioned on a central axis of casing 42. In addition, it is preferable that shaft 50 is a shaft formed by using non-magnetic material. In a case where shaft 50 is composed of magnetic material, a magnetic attraction force is generated between shaft 50 and magnet 80 and thus it becomes difficult to maintain a clearance between shaft 50 and magnet 80 at the time of assembly or the like. Since shaft 50 is composed of non-magnetic material, the magnetic attraction force is not generated and preferable gap (clearance) G between shaft 50 and movable body 20 (specifically, through-hole 20*a*) can be maintained.

Each of upper case 43, lower case 45, and coil holder 44 is composed of metal material such as stainless steel (SUS) which is resistant to a shock. It is preferable that upper case 43, lower case 45, and coil holder 44 are composed of the same metal (for example, stainless steel (SUS) 304).

Coil holder 44 surrounds the outer peripheral side of movable body 20 and holds coil 70 to surround coil 70 at a position close to the outer peripheral side of magnet 80.

Specifically, coil holder 44 is provided with annular inner bottom portion 442 such that inner bottom portion 442 projects toward an axis of coil holder 44 from an inner peripheral surface of tubular outer tubular portion 441 of which opposite openings are closed by upper case 43 and lower case 45 as illustrated in FIGS. 1 and 3. An inner diameter portion of inner bottom portion 442 is provided with inner tubular portion 443 such that inner tubular portion 443 is erected along the axial direction.

Inner tubular portion 443 is formed in a tubular shape that is positioned to face the outer peripheral surface of movable body 20 with a predetermined gap formed therebetween. Here, the "predetermined gap" is a gap in which magnet 80 is allowed to move relative to coil 70. Movable body 20 vibrates in inner tubular portion 443 in the vibration direction. Coil 70 disposed on inner bottom portion 442 is externally fitted onto an outer peripheral surface of inner tubular portion 443.

Coil 70 is held by inner tubular portion 443 and inner bottom portion 442 such that coil 70 is positioned with a gap formed between coil 70 and the outer peripheral side of magnet 80. In other words, coil holder 44 holds coil 70 such that magnet 80 is positioned radially inward of coil 70 to be coaxial with coil 70 with a predetermined gap formed therebetween.

Opening end portions of coil holder 44, that is, upper and lower end portions of coil holder 44 are provided with annular fitting portions 441*a* and 441*b* that are respectively fitted into opening portions of upper case 43 and lower case 45.

Each of upper case 43 and lower case 45 is formed in a bottomed tubular shape and bottom portions 431 and 451 thereof constitute a top surface and a bottom surface of vibration actuator 10 in the present embodiment. Note that, each of upper case 43 and lower case 45 may be obtained by drawing a metal plate in a recessed shape.

Bottom portion 431 of upper case 43 and bottom portion 451 of lower case 45 are disc-shaped bodies and openings 432 and 452 facing each other are formed in central portions thereof. The opposite end portions of shaft 50 are inserted into openings 432 and 452 and are fixed therein. Fixing the opposite end portions of shaft 50 into openings 432 and 452 may be performed by press-fitting shaft 50 into openings 432 and 452 and may be performed by means of adhesion or welding. In addition, shaft 50 may be fixed to casing 42 by means of a combination of press fitting, adhesion, and welding.

In addition, peripheral wall portions of upper case 43 and lower case 45 are respectively provided with annular level difference portions 433 and 453 that extend in the circumferential direction while being separated from bottom portions 431 and 451 (refer to FIGS. 1 to 4). A length between bottom portion 431 and level difference portion 433 and a length between bottom portion 451 and level difference portion 453 may define a movable range of movable body 20.

Level difference portions 433 and 453 have shapes fitted onto annular fitting portions 441*a* and 441*b* of coil holder 44. In addition, level difference portions 433 and 453 fix elastic support portions 60 together with annular fitting portions 441*a* and 441*b*. The fixation structure will be described in detail later.

Dampers 46 and 47 are disposed between upper case 43 and movable body 20 and between lower case 45 and movable body 20 respectively and come into contact at a time when the maximum amplitude of movable body 20 moving in casing 42 is reached, dampers 46 and 47 being shock absorbing members alleviating a shock that is generated at a time when movable body 20 comes into contact with fixing body 40 while moving.

In the present embodiment, dampers 46 and 47 are provided on inner surfaces of bottom portion 431 of upper case 43 and bottom portion 451 of lower case 45, respectively. Dampers 46 and 47 are composed of, for example, sponge or the like, are formed in a ring shape, and are fixed to peripheral edge portions of respective openings 432 and 452 of the inner surfaces of bottom portions 431 and 451, that is, surfaces facing each other.

Dampers 46 and 47 can prevent a strange noise from being generated and can prevent each component from being damaged by a shock due to movable body 20 coming into contact with upper case 43 and lower case 45 in a case where the movement amplitude of movable body 20 in vibration actuator 10 becomes great or a shock from the outside is applied.

<Elastic Support Portions 60>

Elastic support portions 60 are connected to both of movable body 20 and fixing body 40 and movably support movable body 20 with respect to fixing body 40.

Elastic support portions 60 support movable body 20 such that movable body 20 does not come into contact with shaft 50 at a time when movable body 20 does not vibrate and at a time when movable body 20 vibrates. Elastic support portions 60 may have any configurations as long as elastic support portions 60 elastically and movably support movable body 20.

The number of elastic support portions 60 may be one or two or more. Elastic support portions 60 are plate-shaped elastic supporting bodies and for example, are a plurality of plate springs formed by processing a stainless steel sheet metal.

In the present embodiment, elastic support portions 60 are upper plate spring 62 and lower plate spring 64 which are attached such that movable body 20 is interposed between portions separated from each other in the vibration direction.

Upper plate spring 62 and lower plate spring 64 are thin vortex-shaped spring having a disc-like shape. Each of vortex-shaped upper plate spring 62 and vortex-shaped lower plate spring 64 has a shape in which outer peripheral portion 602, which is an outer spring end portion, and inner peripheral portion 604, which is an inner spring end portion, are bonded to each other via arc-shaped arm 606 and outer peripheral portion 602 and inner peripheral portion 604 can be relatively displaced in an axial direction of the elastic support portions.

In the present embodiment, outer peripheral portion 602, which is one end on an outer peripheral side, of each of upper plate spring 62 and lower plate spring 64 is fixed to fixing body 40, while inner peripheral portion 604, which is the other end on an inner peripheral side, of each of upper plate spring 62 and lower plate spring 64 is fixed to movable body 20 such that the vortexes of upper plate spring 62 and lower plate spring 64 face the same direction.

In a case where a plurality of vortex-shaped plate springs are used and respectively attached to the opposite end portions of movable body 20, which are separated from each other in the vibration direction, to elastically support the movable body with respect to the fixing body, the movable body moves in a translation direction (herein, in-plane direction perpendicular to vibration direction) while slightly rotating when the amount of movement of movable body 20 becomes great. If vortexes of the plurality of plate springs face opposite directions, the plurality of plate springs move in a buckling direction and a pulling direction and smooth movement is hindered.

Upper plate spring 62 and lower plate spring 64 in the present embodiment are fixed to movable body 20 such that the vortexes thereof face the same direction. Therefore, even when the moving amount of movable body 20 becomes great, upper plate spring 62 and lower plate spring 64 can move smoothly, that is, upper plate spring 62 and lower plate spring 64 can be deformed. Accordingly, a larger amplitude is achieved and the vibration output can be increased.

Outer peripheral portions 602 of upper plate spring 62 and lower plate spring 64 are bonded to fixing body 40 and inner peripheral portions 604 of upper plate spring 62 and lower plate spring 64 are bonded to movable body 20.

Specifically, inner peripheral portions 604 of upper plate spring 62 and lower plate spring 64 are externally fitted onto the opposite end portions (spring fixation portions 21b and 29b) of movable body 20 which are separated from each other in the axial direction (vibration direction) and upper plate spring 62 and lower plate spring 64 are attached to movable body 20 such that outer peripheral portions 602 project radially outward (in radiation direction). Inner peripheral portions 604 of upper plate spring 62 and lower plate spring 64 and spring fixation portions 21b and 29b may be bonded to each other through welding, adhesion, or the like.

In addition, outer peripheral portions 602 of upper plate spring 62 and lower plate spring 64 are attached to fixing body 40 on a radially outer side.

Outer peripheral portion 602 of upper plate spring 62 is bonded at a fitting portion between upper case 43 and coil holder 44 and outer peripheral portion 602 of lower plate spring 64 is bonded at a fitting portion between coil holder 44 and lower case 45.

In the present embodiment, upper plate spring 62 and lower plate spring 64 are fixed to fixing body 40 via attenuation members (for example, elastic rigs 48a and 48b) that dampens vibration.

Outer peripheral portion 602 of upper plate spring 62 is disposed between elastic ring 48a disposed on level difference portion 433 of upper case 43 and annular fitting portion 441a and is fixed in a state of being interposed between level difference portion 433 and annular fitting portion 441a. Note that, elastic support portions 60 may be fixed between level difference portion 433 and annular fitting portion 441a and between level difference portion 453 and annular fitting portion 441b without elastic rings 48a and 48b.

Elastic ring 48a is composed of soft material such as elastomer, rubber, resin, or a porous elastic body (for example, sponge) and attenuates vibration that is transmitted to level difference portion 433 side via upper plate spring 62, which is elastic support portion 60, when movable body 20 moves.

Note that, the way in which of outer peripheral portion 602 of lower plate spring 64 is fixed to casing 42 is the same as that of upper plate spring 62. That is, outer peripheral portion 602 of lower plate spring 64 is disposed between elastic ring 48b disposed on level difference portion 453 of lower case 45 and annular fitting portion 441b and is fixed in a state of being interposed between level difference portion 453 and annular fitting portion 441b. Note that, elastic ring 48b is similar to elastic ring 48a and has the same function as elastic ring 48a. Accordingly, description of elastic ring 48b will be omitted.

Upper plate spring 62 and lower plate spring 64 are fixed while being pressed against level difference portions 443 and 453 by tip end portions of annular fitting portions 441a and 441b when annular fitting portions 441a and 441b of coil holder 44 are fitted into upper case 43 and lower case 45 and assembled in a state where upper plate spring 62 and lower plate spring 64 are disposed on level difference portions 433 and 453 via elastic rings 48a and 48b.

Outer peripheral portions 602 of upper plate spring 62 and lower plate spring 64 and casing 42 (upper case 43, lower case 45, and coil holder 44) may be bonded to each other by using an adhesive, may be welded to each other, and may be fixed to each other through press fitting. In addition, outer peripheral portions 602 of upper plate spring 62 and lower plate spring 64 and casing 42 may be bonded or fixed to each other by using a method in which adhesion, press fitting, and welding are appropriately combined with each other.

Figure 6:
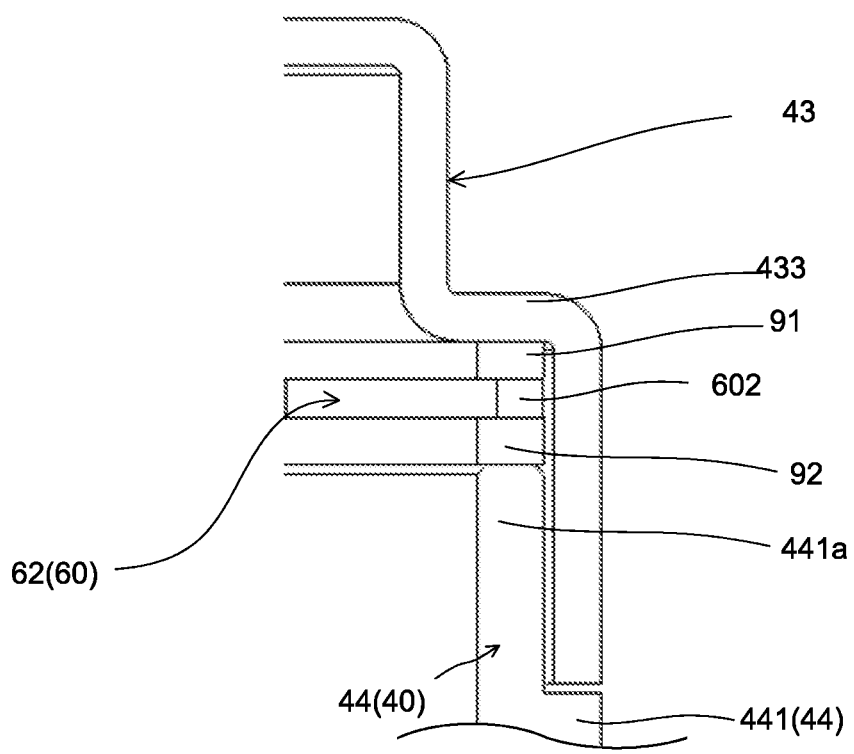
FIG. 6 is a view for describing a modification example of a structure in which the elastic support portions and a casing are bonded to each other.

Here, FIG. 6 illustrates a modification example of a structure in which the elastic support portions, which are upper plate spring 62 and lower plate spring 64, and casing 42 are bonded to each other via an attenuation member.

FIG. 6 is a view for describing a modification example of a structure in which the elastic support portions and the casing are bonded to each other. Specifically, FIG. 6 is a partial enlarged view illustrating bonding portions between upper plate spring 62, which is an example of elastic support portions 60, and casing 42. Outer peripheral portion 602 of upper plate spring 62 as elastic support portion 60 illustrated in FIG. 6 is fixed to casing 42 via attenuation members 91 and 92.

Attenuation members 91 and 92 are ring-shaped members composed of the same material as elastic ring 48a and are interposed between level difference portion 433 and annular fitting portion 441a with outer peripheral portion 602 interposed therebetween in the axial direction (vibration direction).

Since it is considered that movable body 20 in vibration actuator 10 according to the present embodiment constitutes a mass part in a vibration model of a spring-mass system, it is possible to reduce a variation in maximum moving amount of movable body 20 by suppressing (refer to FIG. 8) the resonance being sharp with attenuation members 91 and 92.

Upper plate spring 62 and lower plate spring 64 are fixed to movable body 20 at upper and lower end portions (opposite end portions that are separated from each other in vibration direction and that correspond to spring fixation portions 21b and 29b) of movable body 20 such that the center of gravity of movable body 20 is interposed between upper plate spring 62 and lower plate spring 64.

Upper plate spring 62 and lower plate spring 64 may be disposed on one side with respect to the center of gravity of movable body 20. However, in this case, movable body 20 is fixed in a hanging bell-like shape and becomes likely to be bent with respect to a force in a lateral direction orthogonal to the vibration direction. Accordingly, to maintain a clearance in the lateral direction (specifically, gap between outer tubular portion 441 of coil holder 44 and ring portion 214 of movable body core 21), the structure needs a larger clearance and thus there is a large decrease in degree of freedom in design.

However, in vibration actuator 10, upper plate spring 62 and lower plate spring 64 are fixed to movable body 20 such that the center of gravity of movable body 20 is interposed between upper plate spring 62 and lower plate spring 64. Therefore, when vibration actuator 10 is inclined, bending in the lateral direction is reduced at upper plate spring 62 and lower plate spring 64. Accordingly, even when movable body 20 is held with a small clearance, movable body 20 can be driven without coming into contact with fixing body 40 and thus the degree of freedom in design of each member such as movable body 20, fixing body 40, or the like is increased. For example, it is possible to reduce the size of through-hole 20a of the movable body and thus it is possible to achieve an increase in mass of movable body 20 and to realize a preferable body-felt vibration output by increasing the vibration output.

In addition, it is preferable that a gap between fixation positions of upper plate spring 62 and lower plate spring 64 differs between fixing body 40 side and movable body 20 side. That is, it is preferable that each of upper plate spring 62 and lower plate spring 64 is provided to elastically support movable body 20 in a state where a load is applied thereto, that is, in a state where a pre-load is applied thereto at a time when movable body 20 does not vibrate.

Therefore, the spring constants of upper plate spring 62 and lower plate spring 64 are stable at a time when upper plate spring 62 and lower plate spring 64 are at initial positions, that is, at a time when movable body 20 does not vibrate, and upper plate spring 62 and lower plate spring 64 are held in a stable state with a pre-load applied thereto even when there is a variation in dimension or the like. Accordingly, a variation in mode of the maximum deformation of upper plate spring 62 and lower plate spring 64 at a time of movement is decreased.

Figure 7:
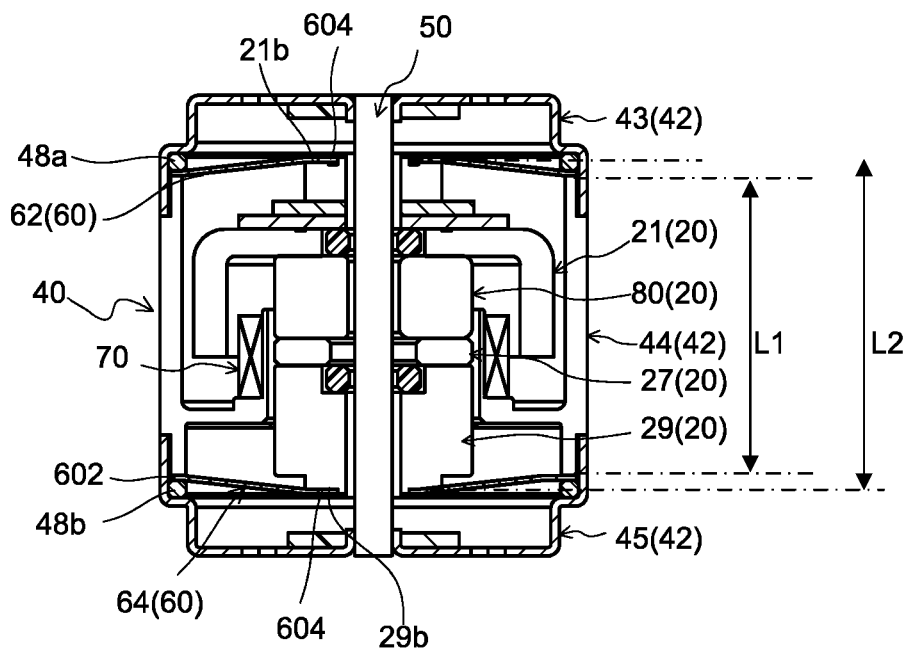
FIG. 7 is a view illustrating an example for describing fixation positions of the elastic support portions.

Specifically, as illustrated in FIG. 7, in the present embodiment, upper plate spring 62 and lower plate spring 64 are fixed such that length L2 between spring fixation portions 21b and 29b fixed to inner peripheral portions 604 becomes longer than length L1 between outer peripheral portions 602 fixed to fixation portions (fitting portions including level difference portions 433 and 453) on fixing body 40 side.

In addition, when bonding outer peripheral portions 602 of upper plate spring 62 and lower plate spring 64 to casing 42 (upper case 43, lower case 45, and coil holder 44), a attenuation member may be also interposed between outer peripheral portion 602 and coil holder 44 such that a vibration attenuation effect of the attenuation members including elastic ring 48a is further improved.

[Magnetic Fluids C1 and C2]

The magnetic fluids are disposed between fixing body 40 and movable body 20 to cause elastic support portions 60 (upper plate spring 62 and lower plate spring 64) to attenuation vibration.

The magnetic fluids may be disposed anywhere in a space between fixing body 40 and movable body 20. For example, the magnetic fluids are provided in one or both of a space between shaft 50 and an inner diameter portion of magnet 80 and a space between an outer diameter portion of magnet 80 and an inner diameter portion of coil 70.

In the present embodiment, the magnetic fluids are provided in the space (represented by C1) between shaft 50 and the inner diameter portion (portion of through-hole 20a) of magnet 80 and the space between the outer diameter portion of magnet 80 and the inner diameter portion (corresponds to inner tubular portion 443 in present embodiment) of coil 70.

Figure 8:
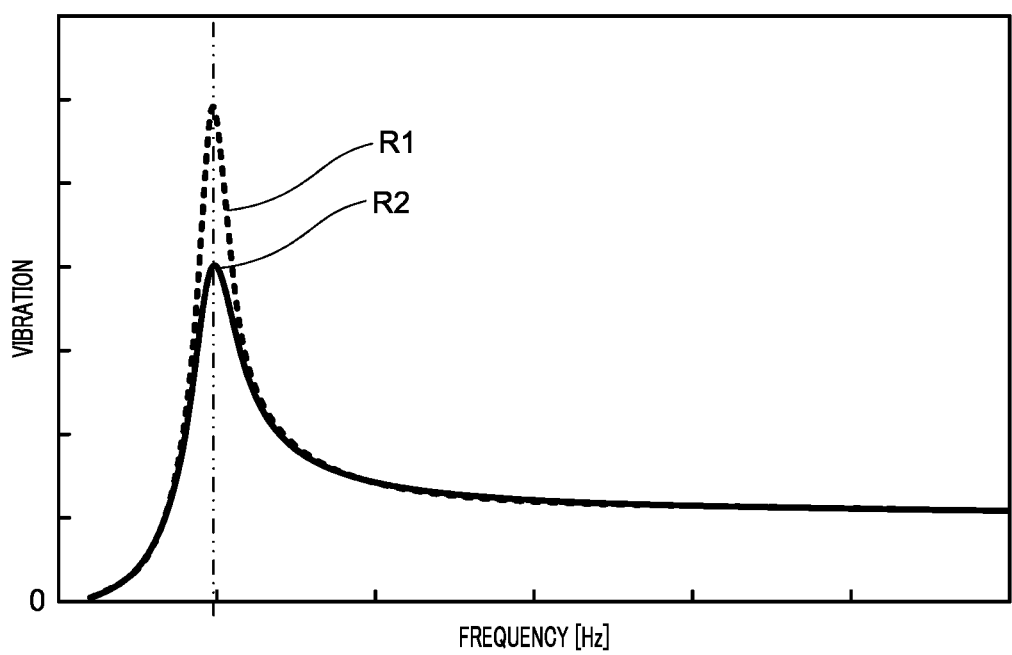
FIG. 8 is a view for describing resonance.

Since it is considered that movable body 20 in vibration actuator 10 according to the present embodiment corresponds to a mass part in a vibration model of a spring-mass system, in a case where the resonance is sharp as illustrated with curved line R1 in FIG. 8, that is, in a case where the resonance has a sharp peak, vibration is attenuated such that the sharp peak is suppressed. A curved line obtained by the attenuation is represented by R2. As illustrated with curved line R2, when vibration is attenuated, the resonance becomes not sharp and there is no variation in maximum amplitude value and maximum moving amount of movable body 20 at the time of resonance. Therefore, it is possible to output vibration with a stable maximum moving amount which is preferable.

Figure 9:
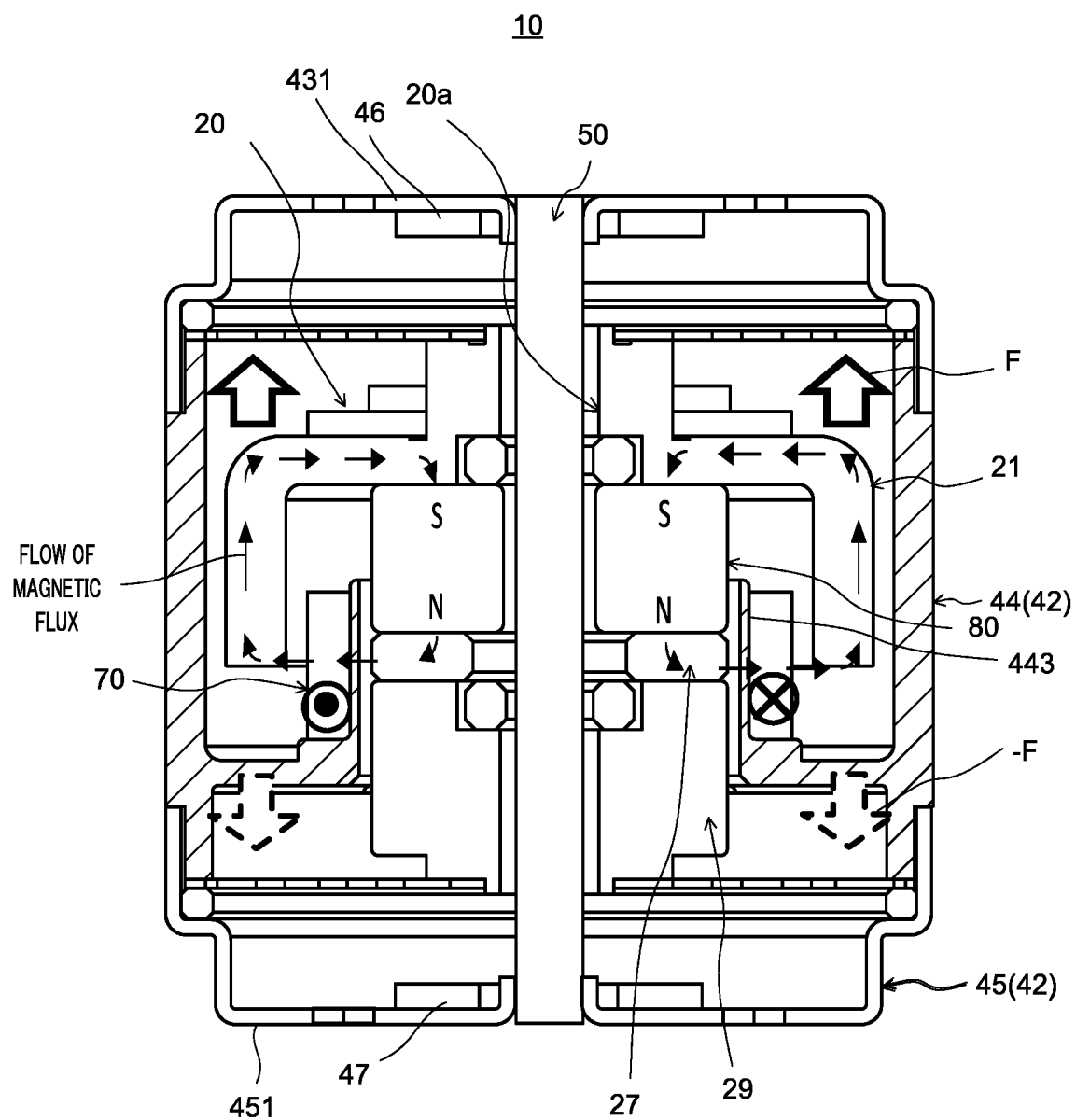
FIG. 9 is a sectional view illustrating a magnetic circuit configuration of the vibration actuator.

In vibration actuator 10, a magnetic circuit as illustrated in FIG. 9 is formed. In addition, in vibration actuator 10, coil 70 is disposed to be orthogonal to a magnetic flux from center yoke 27 which is consecutively connected to magnet 80 of movable body 20. Accordingly, when energization is performed as illustrated in FIG. 9, a Lorentz force in direction −F is generated on coil 70 by interaction between the magnetic field of magnet 80 and an electric current flowing through coil 70 according to the Fleming's left-hand rule.

The direction of the Lorentz force in direction −F is a direction (direction toward bottom portion 451 of lower case 45 of fixing body 40 in FIG. 9) orthogonal to the direction of the magnetic field and the direction of the electric current flowing through coil 70. Since coil 70 is fixed to fixing body 40 (coil holder 44), according to the law of action-reaction, a force opposite to the Lorentz force in direction −F is generated on movable body 20 including magnet 80 as thrust in direction F. Accordingly, movable body 20 including magnet 80 moves in direction F, that is, toward bottom portion 431 of upper case 43.

In addition, when coil 70 is energized with the energization direction of coil 70 switched to the opposite direction, a Lorentz force in opposite direction F is generated. Since the Lorentz force in direction F is generated, according to the law of action-reaction, a force opposite to the Lorentz force in direction F is generated on movable body 20 as thrust (thrust in direction −F) and movable body 20 moves in direction −F, that is, toward bottom portion 451 of lower case 45 of fixing body 40.

Vibration actuator 10 is provided with fixing body 40 including coil 70 and shaft 50, movable body 20 including magnet 80 that is magnetized in the axial direction of coil 70 (vibration direction in which shaft 50 extends) and is disposed radially inward of coil 70, and elastic support portions 60 (upper plate spring 62 and lower plate spring 64) elastically holding movable body 20 such that movable body 20 can move in the vibration direction. In addition, movable body 20 is provided with through-hole 20a into which shaft 50 is inserted with gap G formed between through-hole 20a and the outer peripheral surface of shaft 50 and elastic support portions 60 support movable body 20 such that movable body 20 does not come into contact with shaft 50 at a time when movable body 20 does not vibrate and at a time when movable body 20 vibrates.

Accordingly, since movable body 20 is supported with respect to fixing body 40 such that movable body 20 does not come into contact with shaft 50 with gap G provided therebetween at a time when movable body 20 does not vibrate and move and at a time when movable body 20 vibrates and moves, a noise, which is generated when movable body 20 comes into contact with shaft 50 (specifically, a noise which is generated when movable body 20 slides on coil 70) while movable body 20 is moving, that is, while movable body 20 is vibrating, is not generated.

In addition, movable body 20 comes into contact with shaft 50 inserted into movable body 20 only in a case where a shock is applied to vibration actuator 10 itself such as a case where vibration actuator 10 falls. That is, only in a case where a shock is applied, movable body 20 and shaft 50 relatively move within gap G between through-hole 20a and the outer peripheral surface of shaft 50 and movable body 20 comes into contact with shaft 50 such that the movement thereof is regulated. As described above, according to vibration actuator 10, movable body 20 does not come into contact with an inner wall of fixing body 40 (outer tubular portion 441 of coil holder 44) such that a shock is not applied thereto when movable body 20 is displaced due to a shock applied to the vibration actuator unlike in the case of a vibration actuator in the related art. That is, the inner wall of fixing body 40 is not damaged due to a shock. In addition, elastic support portions 60 (upper plate spring 62 and lower plate spring 64) itself are not deformed due to a shock and thus it is possible to eliminate a failure such as movable body 20 being not movable which is caused by deformation of elastic support portions 60 (upper plate spring 62 and lower plate spring 64).

In addition, according to vibration actuator 10, even in the case of a design in which shaft 50 is disposed at the center such that the movement of movable body 20 is regulated and shock resistance is improved, a sliding sound is not generated when vibration actuator 10 is driven and there is no possibility that a decrease in vibration expression ability is caused by a noise generated due to contact.

As described above, according to vibration actuator 10, it is possible to achieve shock resistance and to output preferable body-felt vibration with a high vibration expression ability.

Here, vibration actuator 10 is driven by an AC wave that is input to coil 70 from the power supply section (for example, driving control section 203 illustrated in FIGS. 10 and 11). That is, the energization direction of coil 70 is switched periodically and thrust in direction F toward bottom portion 431 of upper case 43 and thrust in direction F toward bottom portion 451 of lower case 45 alternately act on movable body 20. Accordingly, movable body 20 vibrates in the vibration direction (winding axis direction orthogonal to radial direction of coil 70, direction in which shaft 50 extends, or magnetization direction of magnet 80) without coming into contact with shaft 50.

Hereinafter, a principle by which vibration actuator 10 is driven will be simply described. In vibration actuator 10 according to the present embodiment, movable body 20 vibrates with respect to fixing body 40 at resonance frequency $f_r$ [Hz] calculated from following equation 1 in a case where the mass of movable body 20 is m [kg] and the spring constant in a torsion direction of the spring (plate spring) is $K_{sp}$.

(Equation 1)

$$f_r = \frac{1}{2\pi}\sqrt{\frac{K_{sp}}{m}} \quad [1]$$

Since it is considered that movable body 20 constitutes a mass part in a vibration model of a spring-mass system, when an AC wave, of which the frequency is equal to resonance frequency $f_r$ of movable body 20, is input to coil 70, movable body 20 enters a resonance state. That is, it is possible to cause movable body 20 to vibrate efficiently by inputting an AC wave, of which the frequency is approximately equal to frequency $f_r$ of movable body 20, to coil 70 from the power supply section.

A motion equation and a circuit equation that represent the principle by which vibration actuator 10 is driven are as follows. Vibration actuator 10 is driven based on a motion equation represented by following equation 2 and a circuit equation represented by following equation 3.

(Equation 2)

$$m\frac{d^2 x(t)}{dt^2} = K_f i(t) - K_{sp} x(t) - D\frac{dx(t)}{dt} \quad [2]$$

m: mass [kg]
x(t): displacement [m]
$K_f$: thrust constant [N/A]
i(t): electric current [A]
$K_{sp}$: spring constant [N/m]
D: attenuation coefficient [N/(m/s)]

(Equation 3)

$$e(t) = Ri(t) + L\frac{di(t)}{dt} + K_e\frac{dx(t)}{dt} \quad [3]$$

e(t): voltage [V]
R: resistance [Ω]
L: inductance [H]
$K_e$: counter-electromotive force constant [V/(m/s)]

That is, mass m [kg], displacement x(t) [m], thrust constant $K_f$ [N/A], electric current i(t) [A], spring constant $K_{sp}$ [N/m], attenuation coefficient D [N/(m/s)], and the like in vibration actuator 10 can be appropriately changed as long as equation 2 is satisfied. In addition, voltage e(t) [V], resistance R [Ω], inductance L [H], and counter-electromotive force constant $K_e$ [V/(rad/s)] can be appropriately changed as long as equation 3 is satisfied.

As described above, according to vibration actuator 10, a large vibration output can be efficiently achieved in a case where coil 70 is energized by an AC wave corresponding to resonance frequency $f_r$ which is determined by mass m of movable body 20 and spring constant $K_{sp}$ of elastic support portions 60, which are plate springs.

In addition, vibration actuator 10 satisfies equations 2 and 3 and is driven by a resonance phenomenon which uses a resonance frequency represented by equation 1. Therefore, in vibration actuator 10, power consumed in a stationary state is only loss caused by a load torque and loss caused by friction and thus vibration actuator 10 can be driven with low power consumption, that is, movable body 20 can be caused to linearly reciprocate with low power consumption.

FIGS. 10 and 11 are views illustrating an example of the way in which vibration actuator 10 is mounted. FIG. 10 illustrates an example in which vibration actuator 10 is mounted in game controller GC and FIG. 11 illustrates an example in which vibration actuator 10 is mounted in portable terminal M.

Game controller GC is connected to a game machine main body via wireless communication and is used by being gripped or held by a user. Game controller GC herein has a rectangular plate-like shape and the user operates game controller GC while grasping right and left sides thereof with both hands.

Game controller GC notifies the user of a command from the game machine main body by means of vibration. Note that, although not shown, game controller GC has a function other than a function of notifying the user of a command. For example, game controller GC has an input operation section with respect to the game machine main body.

Portable terminal M is, for example, a portable communication terminal such as a cellular phone or a smart phone. Portable terminal M notifies the user of an incoming call from an external communication apparatus and realizes each function (for example, function of giving operational feeling or sense of realism) of portable terminal M by means of vibration.

As illustrated in FIGS. 10 and 11, each of game controller GC and portable terminal M is provided with communication section 201, processing section 202, and driving control section 203 and game controller GC is provided with vibration actuators 10A and 10B which are vibration actuators 10 as driving sections while portable terminal M is provided with vibration actuator 10C which is vibration actuator 10 as a driving section. Note that, plurality of vibration actuators 10A and 10B are mounted in game controller GC.

Vibration actuators 10A, 10B, and 10C in game controller GC and portable terminal M are mounted such that a main surface of a terminal and a surface orthogonal to the vibration direction of vibration actuators 10A, 10B, and 10C (herein, bottom surface of lower case 45) become parallel to each other. The main surface of the terminal is a surface that comes into contact with the body surface of the user and in the present embodiment, the main surface of the terminal means a vibration transmission surface that comes into contact with the body surface of the user such that vibration is transmitted.

Specifically, in the case of game controller GC, vibration actuators 10A and 10B are mounted such that a surface, with which the tip of a finger, the ball of a finger, and the palm of a hand or the like of the user operating game controller GC comes into contact, or a surface provided with an operation section becomes orthogonal to the vibration direction. In addition, in the case of portable terminal M, vibration actuator 10C is mounted such that a display screen (touch panel screen) becomes orthogonal to the vibration direction. Accordingly, vibration in a direction perpendicular to the main surfaces of game controller GC and portable terminal M is transmitted to the user.

Communication section 201 is connected to the external communication apparatus via wireless communication, receives a signal from the communication apparatus, and outputs the signal to processing section 202. In the case of game controller GC, the external communication apparatus is a game machine main body as an information communication terminal and communication is performed based on a short range radio communication standard such as Bluetooth (registered trademark). In the case of portable terminal M the external communication apparatus is, for example, a base station and communication is performed based on a mobile communication standard.

Processing section 202 converts a signal input thereto into a drive signal for driving vibration actuators 10A, 10B, and 10C by using a conversion circuit section (not shown) and outputs the drive signal to driving control section 203. Note that, in portable terminal M, processing section 202 generates the drive signal based on a signal input from various function sections (not shown) (for example, operation section such as touch panel) in addition to a signal input from communication section 201.

Driving control section 203 is connected to vibration actuators 10A, 10B, and 10C and a circuit for driving vibration actuators 10A, 10B, and 10C is mounted in driving control section 203. Driving control section 203 supplies the drive signal to vibration actuators 10A, 10B, and 10C.

Vibration actuators 10A, 10B, and 10C are driven according to the drive signal from driving control section 203. Specifically, in each of vibration actuators 10A, 10B, and 10C, movable body 20 vibrates in a direction orthogonal to the main surfaces of game controller GC and mobile terminal M.

Since movable body 20 comes into contact with bottom portion 431 of upper case 43 or bottom portion 451 of lower case 45 via dampers 46 and 47 each time when movable body 20 vibrates, a shock to bottom portion 431 of upper case 43 or bottom portion 451 of lower case 45 that is accompanied by vibration of movable body 20, that is, a shock to casing 42 is directly transmitted to the user as vibration. In particular, in the case of game controller GC, one of plurality of vibration actuators 10A and 10B can be driven according to the input drive signal or both of vibration actuators 10A and 10B can be driven according to the input drive signal at the same time since plurality of vibration actuators 10A and 10B are mounted in game controller GC.

Since vibration in a direction perpendicular to the body surface is transmitted to the body surface of the user that comes into contact with game controller GC or portable terminal M, sufficient body-felt vibration can be applied to the user. In the case of game controller GC, the body-felt vibration can be applied to the user with one or both of vibration actuators 10A and 10B and thus it is possible to apply vibration with a high expression capability by selectively applying at least weak vibration and strong vibration.

Hereinabove, the present invention made by the present inventors has been specifically described based on the embodiment. However, the present invention is not limited to the above-described embodiment and modification can be made without departing from the gist thereof.

In addition, for example, the vibration actuator according to the present invention is preferable when being applied to portable equipment (for example, portable information terminal such as tablet PC, portable game terminal, and wearable terminal which user wears and uses) other than game controller GC and portable terminal M described in the embodiment. In addition, vibration actuator 10 in the present embodiment can be used for an electric cosmetic tool such as a facial massager which needs vibration in addition to the above-described portable equipment.

INDUSTRIAL APPLICABILITY

The vibration actuator according to the present invention is resistant to a shock, can output preferable body-felt vibration, and is useful as a vibration actuator installed in electronic equipment such as a game machine terminal or an information terminal which applies vibration to a user.

REFERENCE SIGNS LIST 10, 10A, 10B, 10C Vibration actuator
20 Movable body
20a Through-hole
21 Movable body core
21a Opening
21b, 29b Spring fixation portion
21c, 29a Counterbored portion
24, 25 Bush
27 Center yoke
29 Weight portion
292 Tubular protruding portion
40 Fixing body
42 Casing
43 Upper case
431, 451 Bottom portion
433, 453 Level difference portion
44 Coil holder
441 Outer tubular portion
441a, 441b Annular fitting portion
442 Inner bottom portion
443 Inner tubular portion
45 Lower case
46, 47, Damper
48a, 48b Elastic ring (attenuation member)
50 Shaft (shaft portion)
60 Elastic support portion
602 Outer peripheral portion
604 Inner peripheral portion
606 Arm
62 Upper plate spring (elastic support portion)
64 Lower plate spring (elastic support portion)
70 Coil
80 Magnet
91, 92 Attenuation member
201 Communication section
202 Processing section
203 Driving control section
212 Flat plate portion
214 Ring portion

What is claimed is:

1. A vibration actuator, comprising:
a movable body including one of a coil and a magnet disposed on a radially inner side of the coil while being spaced from the coil;
a fixing body including the other one of the coil and the magnet, and a shaft portion that is inserted into the movable body; and
an elastic support portion movably supporting the movable body with respect to the fixing body such that the movable body vibrates with respect to the fixing body in a vibration direction by means of cooperation between the coil supplied with power and the magnet, wherein:
the movable body is provided with an inner peripheral surface that defines a through-hole into which the shaft portion is inserted,
the inner peripheral surface is disposed such that a gap that prevents the movable body from coming into contact with the shaft portion both at a time when the movable body does not vibrate and at a time when the movable body vibrates is formed over an entire length of the movable body in the vibration direction,
a part of the inner peripheral surface is composed of a contact member having a smaller diameter than a remainder part of the inner peripheral surface and disposed to face an outer peripheral surface of the shaft portion with the gap, and
the contact member is configured to, when the movable body and the shaft portion in the through hole are relatively displaced in the radial direction due to an external shock, alleviate the external shock by coming into contact with the shaft portion.

2. The vibration actuator according to claim 1, wherein the elastic support portion is a plate spring that is disposed to extend in a direction intersecting the vibration direction and of which opposite ends are fixed to the fixing body and the movable body.

3. The vibration actuator according to claim 1, wherein the elastic support portion is a plurality of plate springs that are disposed while being separated from each other in the vibration direction such that a center of gravity of the movable body is interposed therebetween, each of the plate springs extending in a direction intersecting the vibration direction.

4. The vibration actuator according to claim 3, wherein the plurality of plate springs being the elastic support portion are vortex-shaped springs having the same shape, and one end on an outer peripheral side of each of the plate springs is fixed to the fixing body while another end on an inner peripheral side of each of the plate springs is fixed to the movable body such that vortexes of the plate springs face the same direction.

5. The vibration actuator according to claim 1, wherein:
the movable body includes the magnet, a center yoke, and a weight portion into which the shaft portion is inserted with the gap formed therebetween, the magnet, the center yoke, and the weight portion being consecutively provided to each other in the vibration direction and being disposed radially inward of the coil of the fixing body, and
the center yoke is positioned to face a central portion in the vibration direction of an inner peripheral surface of the coil at a time when the movable body does not vibrate.

6. The vibration actuator according to claim 1, wherein the movable body includes the magnet and the fixing body includes the coil, and
the shaft portion of the movable body is formed of a non-magnetic material.

7. The vibration actuator according to claim 1, wherein the contact member is disposed such that the contact member extends in a circumferential direction.

8. The vibration actuator according to claim 7, wherein the contact member is formed of a resin or elastomer.

9. The vibration actuator according to claim 3, wherein a length in an axial direction between fixation positions on the fixing body to which the plurality of plate springs are respectively fixed and a length in the axial direction between fixation positions on the movable body to which the plurality of plate springs are respectively fixed are different from each other.

10. The vibration actuator according to claim 9, wherein a length between fixation positions on the movable body to which the plurality of plate springs are respectively fixed and that are separated from each other in the vibration direction is longer than a length between positions on the fixing body to which the plurality of plate springs are respectively fixed and that are separated from each other in the vibration direction.

11. The vibration actuator according to claim 1, wherein a magnetic fluid is provided between the fixing body and the movable body.

12. The vibration actuator according to claim 11, wherein the magnetic fluid is disposed between the shaft portion and the through-hole or between an outer diameter portion of the magnet and an inner diameter portion of the coil or is disposed between the shaft portion and the through-hole and between the outer diameter portion of the magnet and the inner diameter portion of the coil.

13. The vibration actuator according to claim 1, wherein the elastic support portion is fixed to the fixing body via an attenuation member that attenuates vibration.

14. Electronic equipment in which the vibration actuator according to claim 1 is mounted.

15. The vibration actuator according to claim 1, wherein:
the movable body includes the magnet,
the fixing body includes the coil, and
a plurality of the contact members are disposed on both sides of the magnet in the vibration direction.

16. The vibration actuator according to claim 1, wherein the fixing body is provided with dampers with which the movable body comes into contact at a time of a maximum amplitude of the movable body, the dampers being provided at opposite positions in the vibration direction.

* * * * *